United States Patent
Eberlein et al.

(10) Patent No.: US 9,858,309 B2
(45) Date of Patent: *Jan. 2, 2018

(54) MANAGING WRITE ACCESSES DURING DATABASE UPGRADE PROCEDURE

(71) Applicants: Peter Eberlein, Malsch (DE); Volker Driesen, Heidelberg (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 566 days.

This patent is subject to a terminal disclaimer.

(21) Appl. No.: 14/508,876

(22) Filed: Oct. 7, 2014

(65) Prior Publication Data

US 2016/0098438 A1  Apr. 7, 2016

(51) Int. Cl.
*G06F 17/30* (2006.01)

(52) U.S. Cl.
CPC .. *G06F 17/30362* (2013.01); *G06F 17/30292* (2013.01); *G06F 17/30339* (2013.01)

(58) Field of Classification Search
CPC ........ G06F 8/65; G06F 8/67; G06F 17/30292; G06F 17/30345; G06F 17/30377; G06F 8/68; G06F 17/30339; G06F 11/14; G06F 11/1433; G06F 17/30297; G06F 17/30351; G06F 17/303; G06F 17/30362; G06F 17/30; G06F 17/30575; G06Q 10/0631

See application file for complete search history.

(56) References Cited

U.S. PATENT DOCUMENTS

| | | | |
|---|---|---|---|
| 6,965,899 B1 | 11/2005 | Subramaniam et al. | |
| 7,523,142 B2 | 4/2009 | Driesen et al. | |
| 8,200,634 B2 | 6/2012 | Driesen et al. | |
| 8,212,683 B2 | 7/2012 | Klein et al. | |
| 8,417,737 B2 | 4/2013 | Hopmann et al. | |
| 8,521,706 B2 | 8/2013 | Alpern et al. | |
| 8,706,991 B2 | 4/2014 | Colbert et al. | |
| 8,745,445 B1 | 6/2014 | Choi et al. | |
| 2005/0071359 A1 | 3/2005 | Elandassery et al. | |
| 2010/0138440 A1 | 6/2010 | Driesen | |
| 2010/0162226 A1 | 6/2010 | Borissov et al. | |
| 2011/0107135 A1 | 5/2011 | Andrews et al. | |
| 2012/0036165 A1 | 2/2012 | Driesen et al. | |
| 2012/0089566 A1* | 4/2012 | Effern | G06F 17/30377 707/611 |
| 2012/0303665 A1 | 11/2012 | Engelko et al. | |
| 2013/0238555 A1 | 9/2013 | Driesen et al. | |
| 2013/0238577 A1 | 9/2013 | Driesen et al. | |
| 2014/0068584 A1 | 3/2014 | Lim et al. | |
| 2015/0106140 A1* | 4/2015 | Biewald | G06Q 10/0631 705/7.12 |

FOREIGN PATENT DOCUMENTS

WO    WO-99/08206 A1    2/1999

* cited by examiner

*Primary Examiner* — Shyue Jiunn Hwa

(74) *Attorney, Agent, or Firm* — Mintz Levin Cohn Ferris Glovsky and Popeo, P.C.

(57) ABSTRACT

As part of an upgrade procedure transitioning from a source system to a target system, table entries used by both the source system and the target system can be selectively locked on a row-by-row basis using a lock table and one or more select triggers. Related apparatus, systems, techniques and articles are also described.

14 Claims, 16 Drawing Sheets

Reconnect with Micro Freeze

Upgrade: Delta Import & Migration

MANAGING WRITE ACCESSES DURING DATABASE UPGRADE PROCEDURE

TECHNICAL FIELD

The subject matter described herein relates to management of write accesses during upgrade procedures, such as zero downtime maintenance upgrade procedures, using select triggers.

BACKGROUND

Deployment of maintenance packages to computing platforms often requires downtime of such platforms. At the beginning of downtime, a backup is created and this backup serves as a fallback option, in case the upgrade fails. Advancements in technology have enabled for reduced, and in some cases, zero downtime upgrades. With such arrangements, upgrade procedures run in parallel to a production system within the same database for the complete duration of the upgrade. The procedure creates clones of the tables, which are changed by the upgrade and runs database triggers to replicate data from production to the upgrade copy of the tables.

With a zero downtime upgrade, the upgrade procedure and the production operate against the database at the same time. The upgrade tool potentially reads data from the database, and derives actions out of the data read. If the data is later changed by an application forming part of the production system, the results of the upgrade are invalidated. The entries read by the upgrade must therefore be locked against writing in the production system.

SUMMARY

In a first aspect, an upgrade procedure is initiated that updates the source system to the target system. The upgrade procedure prepares software for the target system in parallel to operation of an application on the source system. Thereafter, a select trigger determines that the upgrade procedure reads a first key in a production table being used both by the upgrade procedure and the application. The select trigger then writes the first key into a lock table. A freeze trigger determines, after the first key is written into a lock table, that the application initiated a write request for the first key in the production table. The freeze trigger accesses the lock table to identify the first key as being locked. As a result, the application is prevented from writing to the first key in the production table based on the identification in the lock table.

The upgrade procedure can include one or more of selectively (i) renaming source tables of the source system, (ii) cloning the renamed source tables for the target system, (iii) equipping the cloned tables with database triggers to transfer data to target tables used by the source system according to a source database schema, (iv) generating the target tables comprising updated software content for later use by the target system while the source tables are used via a bridge database schema, and (v) sharing tables between the source database schema accessed via the bridge database schema and the target system. The upgrade procedure can be a zero downtime maintenance upgrade procedure. The first key can include a range of keys in the production table.

Entries in the lock table can be cleared upon switching from the source system to the target system. The application can be able to write to the first key in the production table after switching from the source system to the target system.

In a second interrelated aspect, an upgrade procedure is initiated that updates a source system to a target system. The upgrade procedure prepares software for the target system in parallel to operation of an application on the source system. In addition, a clone trigger causes changes to the production table used by the application to be cloned to a table being used by the upgrade procedure. A select trigger determines that the upgrade procedure read a first key in the production table. The select trigger then writes the first key into a lock table. A freeze trigger determines, after the first key is written into a lock table, that the application initiated a write request for the first key in the table used by the production table. Thereafter, the freeze trigger accesses the lock table to identify the first key as being locked. The application is then prevented from writing to the first key based on the identification in the lock table.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter can efficiently manage write accesses to a shared table by an application during an upgrade procedure. In particular, with the current subject matter, locks are applied to a particular key as opposed to conventional techniques which can require a lock on the entire corresponding table. In addition, the current subject matter is advantageous in that it operates on the database layer which, in contrast to techniques operating on the application layer, are difficult to bypass.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter enables ensuring that table entries read by the upgrade tool are not altered by production during the remaining upgrade procedure runtime. Various types of zero downtime maintenance/upgrade procedures can be utilized such as that described in U.S. Pat. App. Pub. No. 20130238555 entitled: "Aliases for accessing shared tables during provision of continuous access during application upgrade" and in U.S. Pat. App. Pub. No. 20130238868 "Using temporary system to provide continuous access during application upgrade", the contents of both of which are hereby fully incorporated by reference. As will be described in further detail below, if a table is populated during the upgrade, the upgrade procedure creates a copy of the table, installs a database trigger to replicate all changes done by production from the production table to the upgrade's copy. At the end of the upgrade, the access of production is switched to the target table. For the revoke procedure, the copy of the table created for the upgrade can be dropped and usage can remain with the original table. Similar approaches can be defined for all other table categories.

Figure 1:
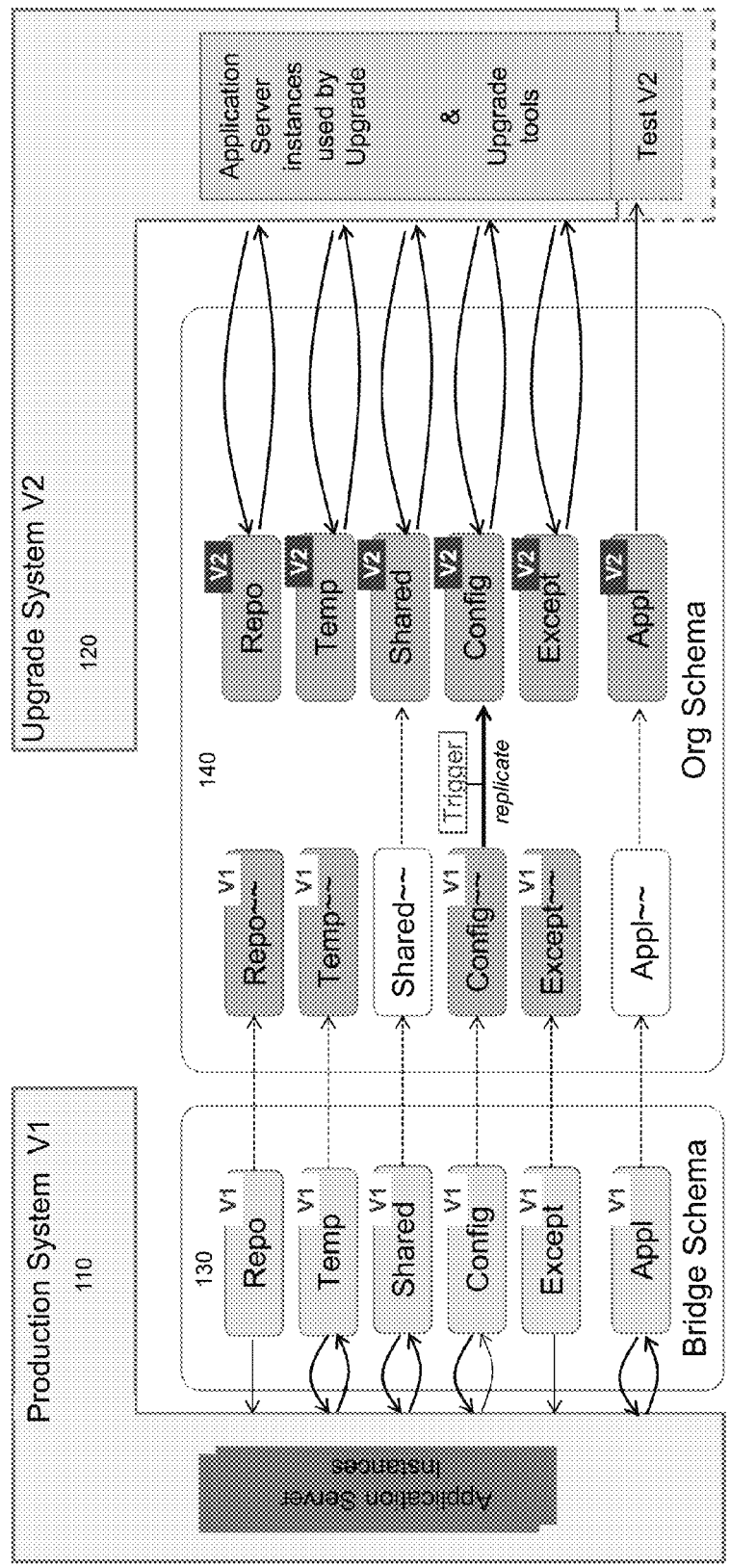
FIG. 1 is a first diagram illustrating a zero downtime upgrade procedure.

FIG. 1 is a diagram 100 illustrating a process of a zero downtime upgrade of a production system 110 (sometimes referred to as a source system) to an upgrade system 120 (sometimes referred to as a target system). The production system 110 runs various application server instances executing a first version of software (as indicated by the designation V1) and the upgrade system 120, when upgraded, runs various application server instances running a second version of software (as indicated by the designation V2). As part of a zero-downtime upgrade from the production system 110 to the upgrade system 120, a bridge schema 130 provides various tables of data that are in turn used by an original schema 140 to generate/populate alias tables that, in turn, are used to generate tables that are ultimately used by the upgrade system 120. In some cases, the upgrade system 120 can be tested prior to going live. Further details are provided below.

Figure 2:
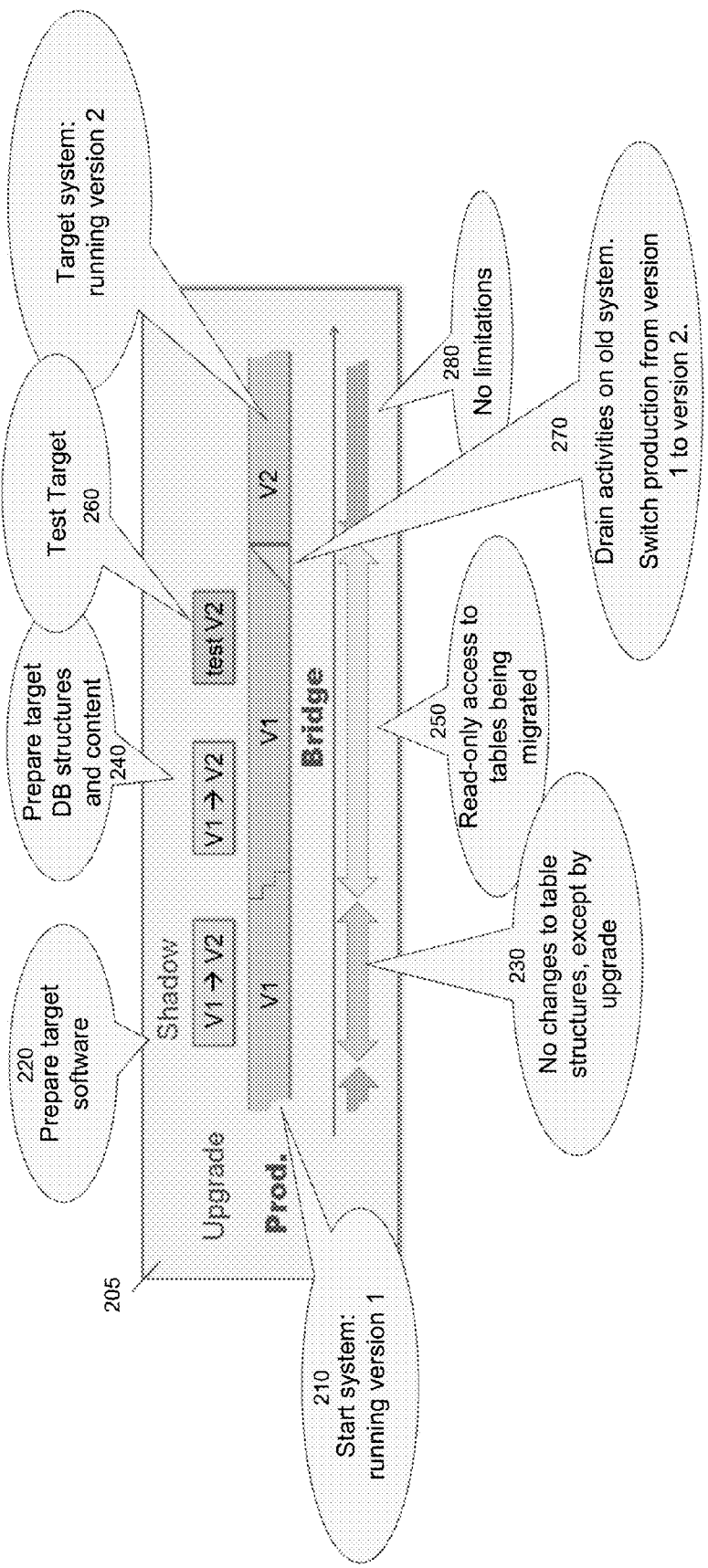
FIG. 2 is a first diagram illustrating a zero downtime upgrade procedure.
Figure 3:
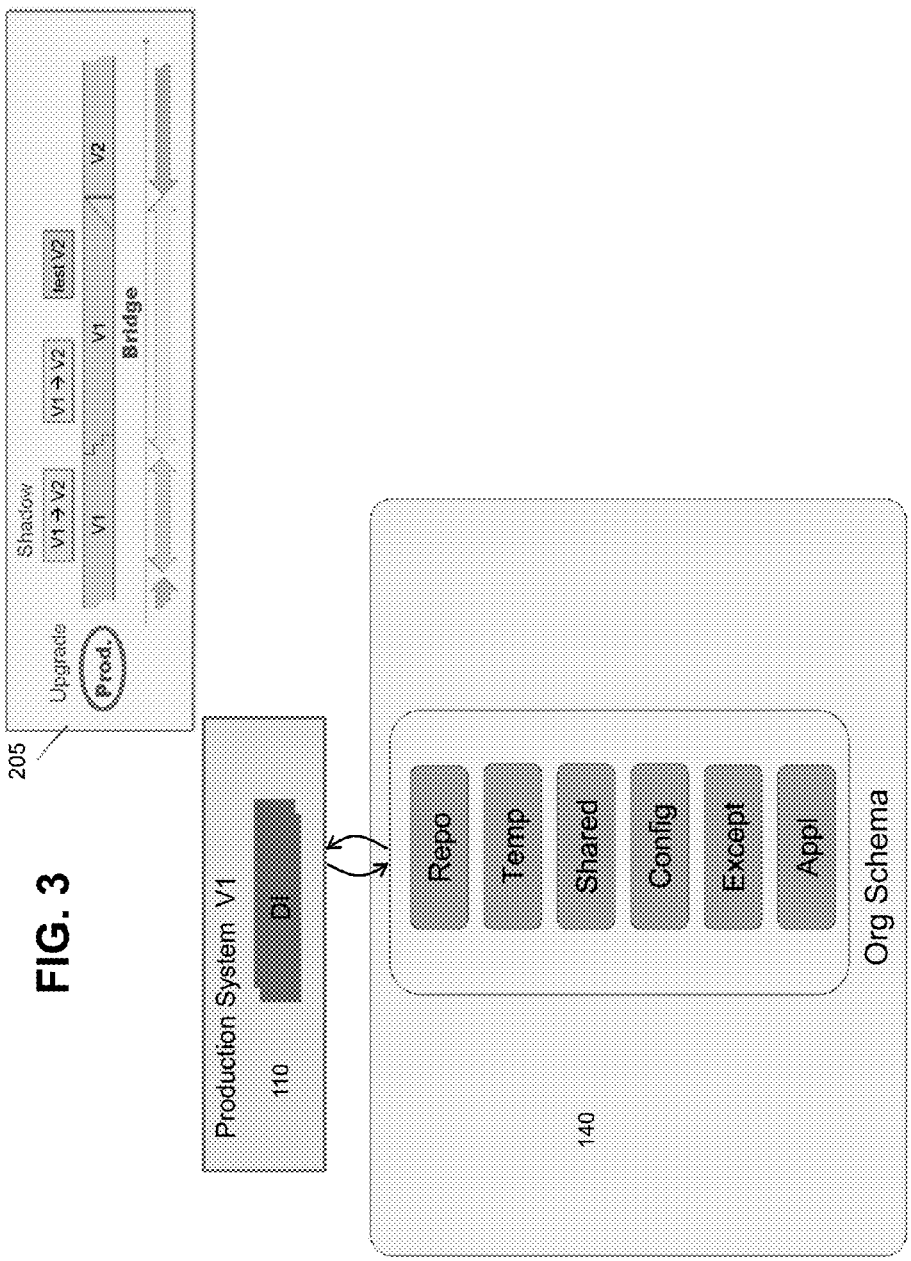
FIGS. 3-12 provide a sequence of a zero downtime upgrade procedure.

FIG. 2 is a diagram 200 providing an overview of a zero downtime upgrade process moving from version 1 (V1) software on a production system to version 2 (V2) software on the target system. With reference to the legend 205, at 210, the production system is initially running version 1 software. Subsequently, at 220, target software including (shadow tables) is prepared. No changes are made, at 230, to table structures except where upgrades require changes. Thereafter, at 240, target database structures and content are prepared. During such time, at 250, the tables being migrated are only accessible via read-only access. Prior to deployment, at 260, the target software can be tested. If the testing is successful, at 270, production is switched from version 1 to version 2 and, at 280, activities are drained/ceased on the old production system.

Stated differently, a zero downtime maintenance procedure can work by first generating upgrade scripts. Thereafter, revoke scripts can be generated. Next, the application upgrade package can be analyzed so that it can be derived which tables get content by the upgrade package, are changed in structure by the upgrade package (so that such tables can be categorized based on their treatment in the upgrade). In addition, the target software (i.e., the upgraded software) can be prepared in parallel to production use. The target database tables are also prepared. In case the table gets content, it is cloned: a copy can be created including all content and one or more triggers ensure the content remains up-to-date to changes. In cases in which a table's content is migrated, a copy of the table is created and the original table can be designated as read-only and a migration report can be run. Thereafter, the upgraded content is deployed to the cloned tables. After the target version is tested and confirmed to be working properly, users can be switched to the target version.

The zero downtime revoke procedure can work as follows. First, the upgrade instance can be stopped. Thereafter, persistent enqueue locks (i.e., locks against write operations by the applications that provide an exclusive change permission by the upgrade procedure for certain objects, etc.) on the upgrade tables can be removed. Furthermore, entries and fields associated with the upgrade can be removed in shared tables. In cases in which a bridge table is used, the original table can be dropped. Thereafter, the tables can be switched from the bridge to the original. Old views on original tables can be created and the original instance can be started with a standard connect. Thereafter, users can be switched back to the original version and any remaining instances can be restarted with standard connect. Furthermore, any unused remainders of the upgrade can be removed.

The tables in the database can be sorted into various categories. First, there are the Config tables that receive the content for the upgrade. The Config tables can be cloned by creating a copy of the table and having a database trigger replicate all data from the table used by production to the table used by the upgrade to deploy new data. For the Config tables, the revoke procedure drops the table used by the upgrade. The table used by production is consistent in structure and content with respect to the start release. Furthermore, upon the switch of production to target version, the production is configured to use also the target table.

Another type of table does not receive content for the upgrade but their structure is adjusted (e.g., new fields are added, etc.). The access by production to such tables can be redirected to a projection view on the table. The view can include the same fields of the table's structure as of the start release version. Subsequently, these tables can be extended on the database level through the addition of new fields. The production can access this extended table. For these tables, the revoke can cause these new fields to be dropped. Furthermore, upon the switch from the production version to the target version, the production is configured to use the table and not the projection view.

There can additionally be tables that are not touched by the upgrade. That is, neither the structure nor the content of such tables are changed. With such tables, locks can be set, either for the complete table or for single rows. The revoke procedures causes the release of the locks. Furthermore, for the switch to the target version, the locks are released as well.

Another type of table can be referred to as an "Except" exception table. With these tables, other types of changes are made (i.e., an application program modifies the content of the table to match the target version) that can be put to read-only for the bridge. For example, if a field is set to be longer, the table is then part of the Except category. These tables can be set to read-only for the production. A table with a different name can be created, but with the tables target structure. Thereafter, a batch job can be run, which transfers all data from the original table to the target table. Upon the switch of production to target version, the production can be configured to also use also target table. For the revoke procedure, the system can be configured to use the old version of the table.

Figure 4:
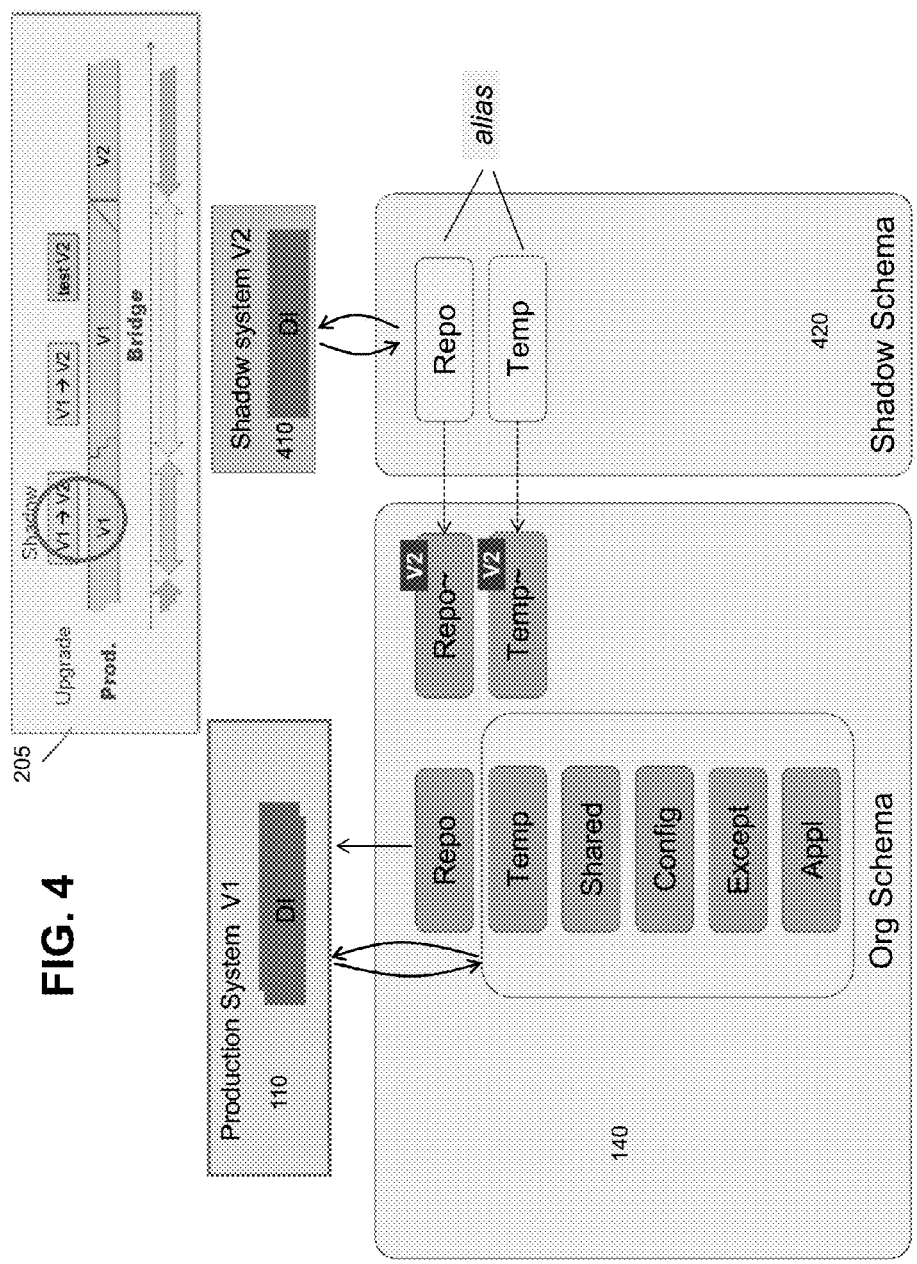

FIGS. 3-12 provide an overview zero downtime upgrade procedure. With reference to diagram 300 of FIG. 3, before the upgrade, user can use a dialog instance connected to a standard schema. Diagram 400 of FIG. 4 illustrates an uptime and shadow system period in which preparation checks are run. Maintenance mode is switched on (no changes to table structures except by upgrade). In addition, a shadow system 400 with shadow schema 410 is set up, the target software is deployed to tables "Repo~" and the target structures of the tables are computed. The shadow system is a mechanism to prepare the content in the shadow tables named TABLE~, e.g. for the repository content stored in Repo~. Details regarding the use of a shadow system can be found in U.S. Pat. No. 7,523,142 entitled: "Systems, methods and articles of manufacture for upgrading a database with a shadow system", the contents of which are hereby fully incorporated by reference. Changes brought by the upgrade can be analyzed to determine which tables for migration are to be cloned later. In addition, the content brought by the upgrade can be analyzed to determine which tables to later clone.

Figure 5:
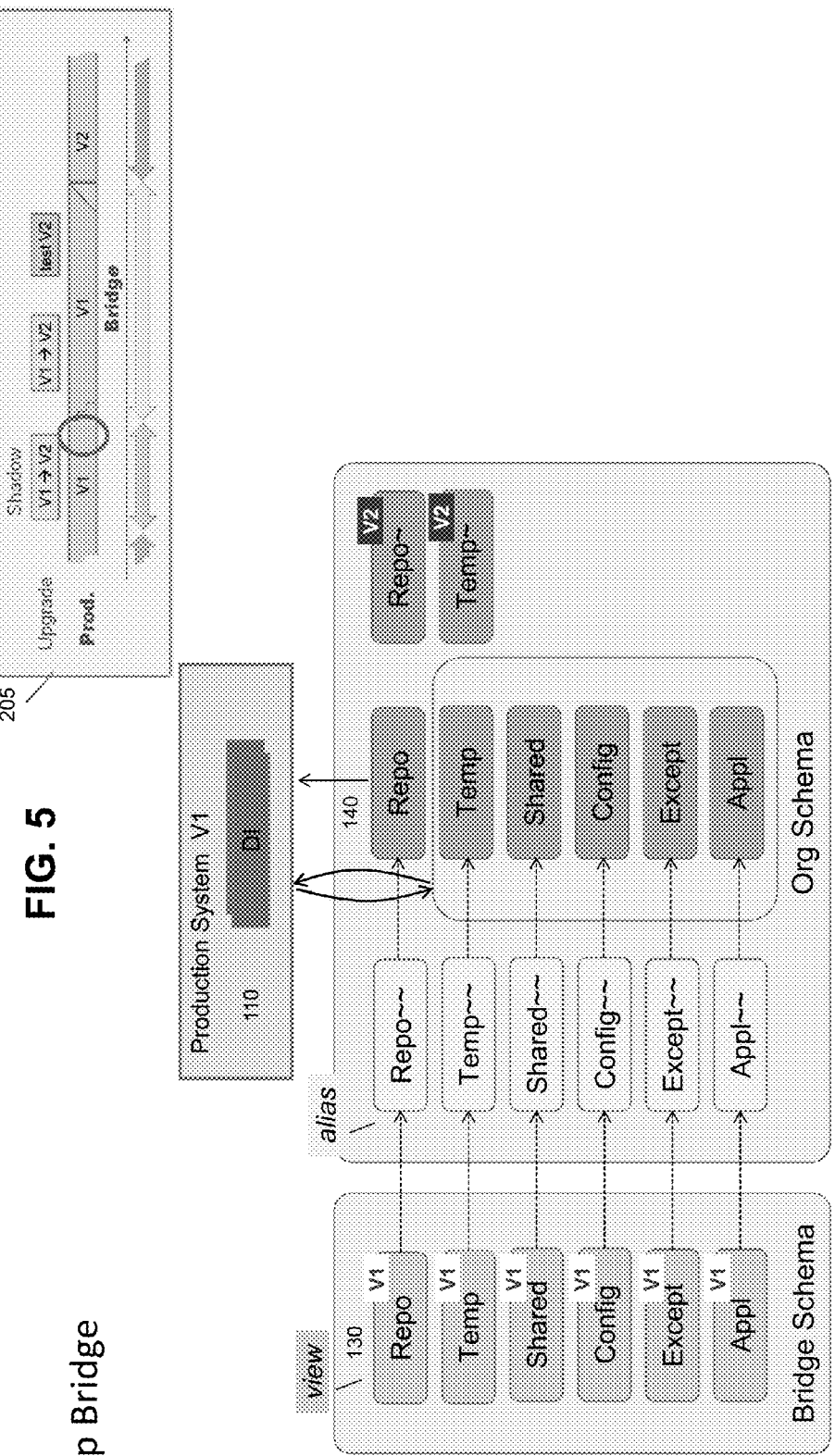

With reference to diagram 500 of FIG. 5, an alias "TABLE~~" for all tables "TABLE" is created. In addition, a second database schema "bridge schema" 130 can be created as well as a view "TABLE" for all aliases in the original schema "TABLE~~". Additionally, in the bridge schema a view is created for all tables, which do not have a TABLE~~ counterpart. The views have the structure of the tables of the start release.

Figure 6:
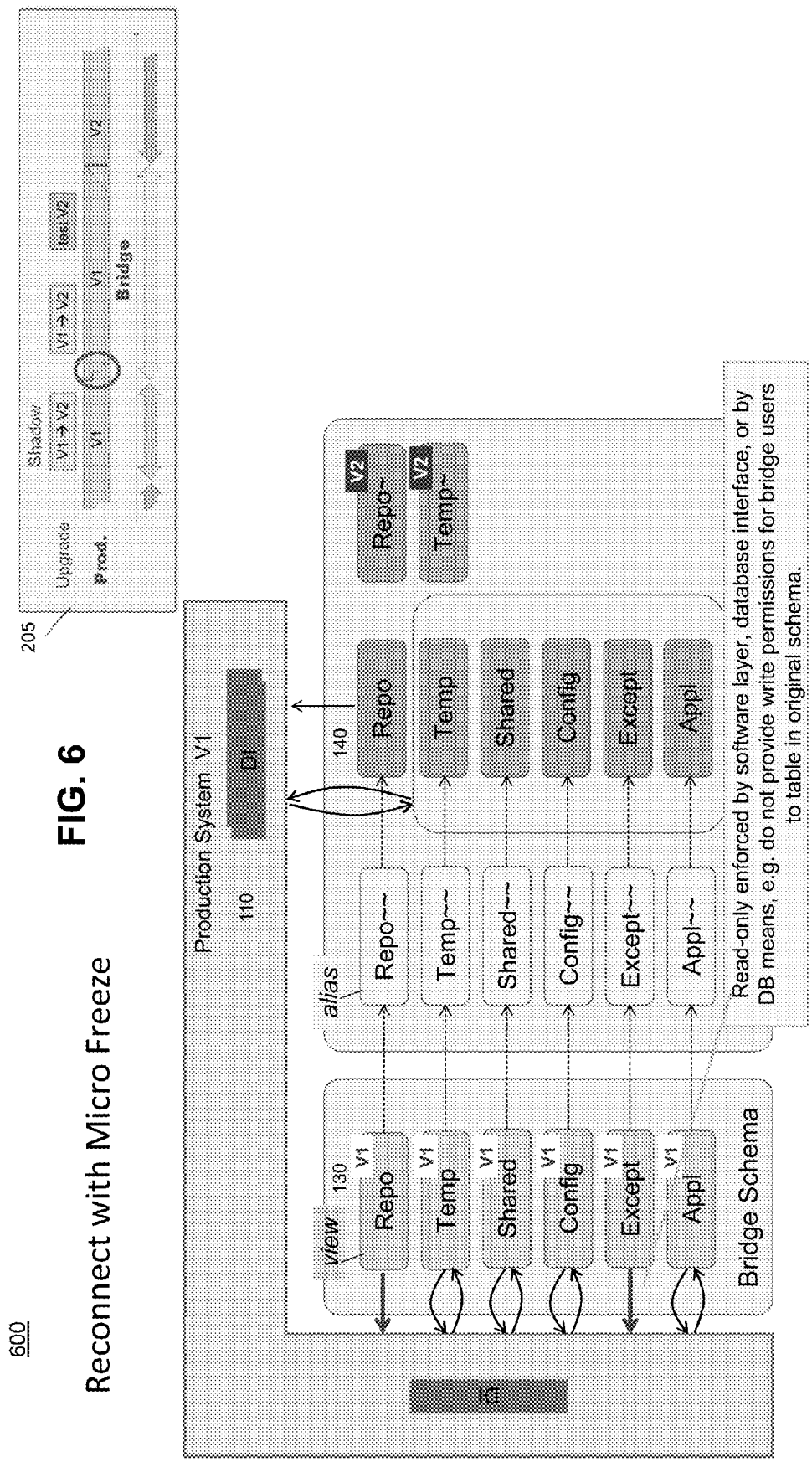

With reference to diagram 600 of FIG. 6, dialog instances can be reconnected from the original schema 140 to the bridge schema 130. The dialog instances "suspend" all actions by users, disconnect from the DB original schema 140 and connect to bridge schema 130. Further, as part of a bridge operation period, production runs on the production system 110 connected to the bridge schema and tables, which will be migrated later, are designated as read-only.

Figure 7:
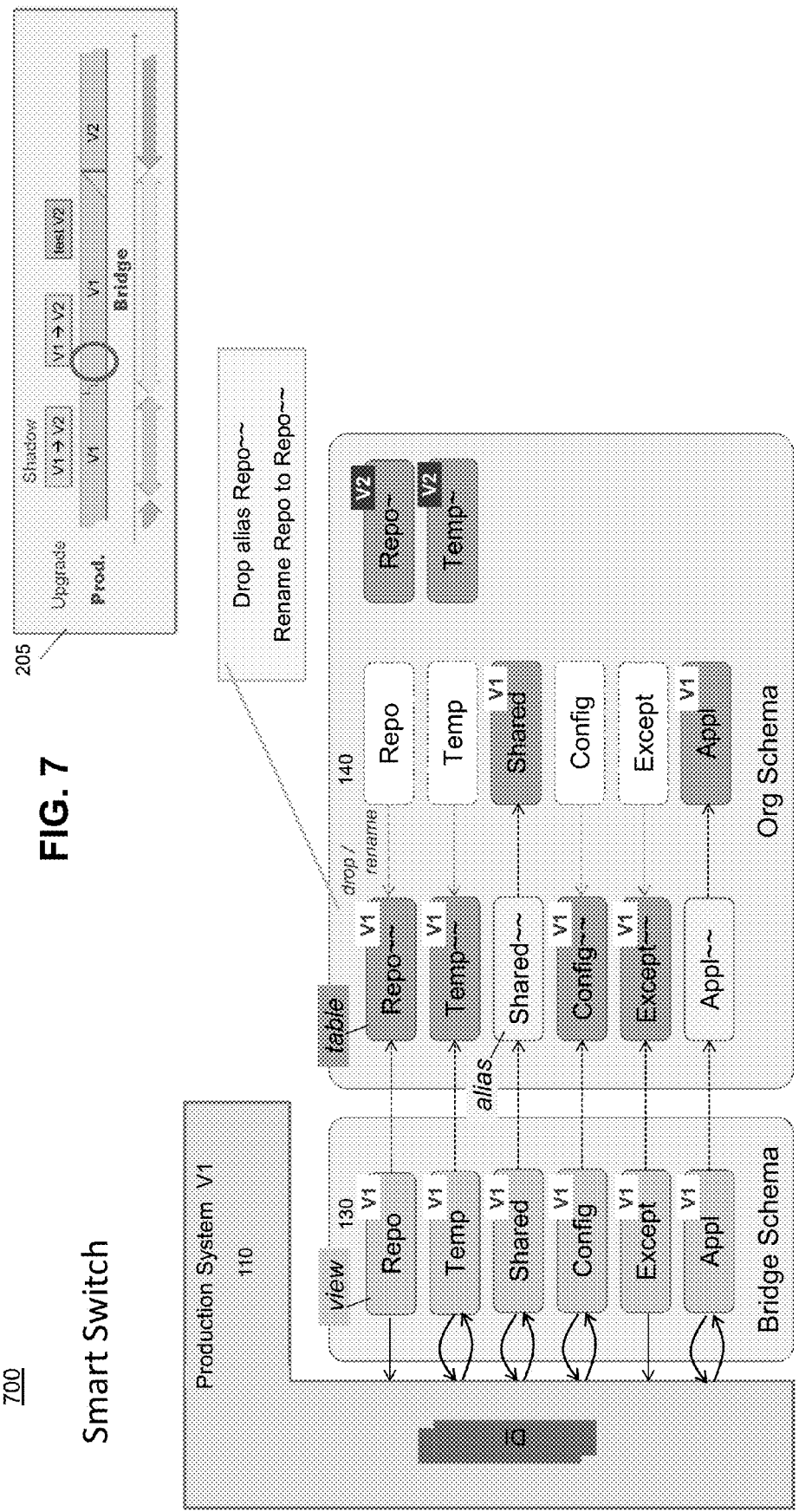

With reference to diagram 700 of FIG. 7, for a smart switch, for those tables that are switched from shadow ("Repo", "Temp") or cloned later, ("Config", "Except"), a smart switch is run. The smart switch causes the alias "Repo~~" to be dropped and the table "Repo" to be renamed to "Repo~~".

Figure 8:
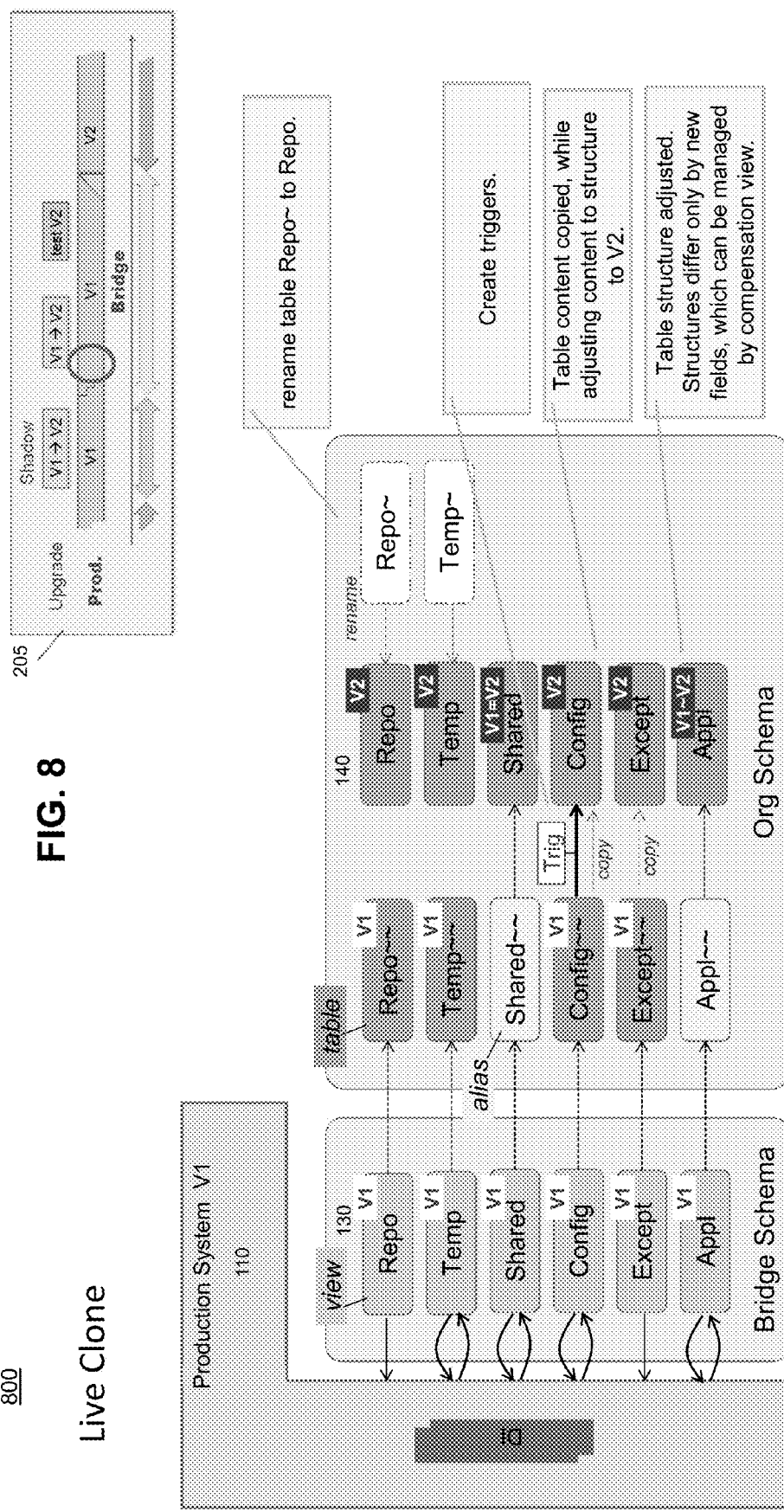

With reference to diagram 800 of FIG. 8, as part of a live clone process, the shadow tables are renamed ("Repo~", "Temp~") and Repo~ is renamed to Repo. The tables are created with the target structure ("Config", "Except"). A trigger is created for the "Config" tables, which transfers all changes done by production to Config~~ to Config. The unchanged data is then copied from Config~~ to Config. The tables, which are shared ("Share" and "Appl") are adjusted structure-wise. New fields can be added (with more complex structure change resulting in the table being in category "Except").

Figure 9:
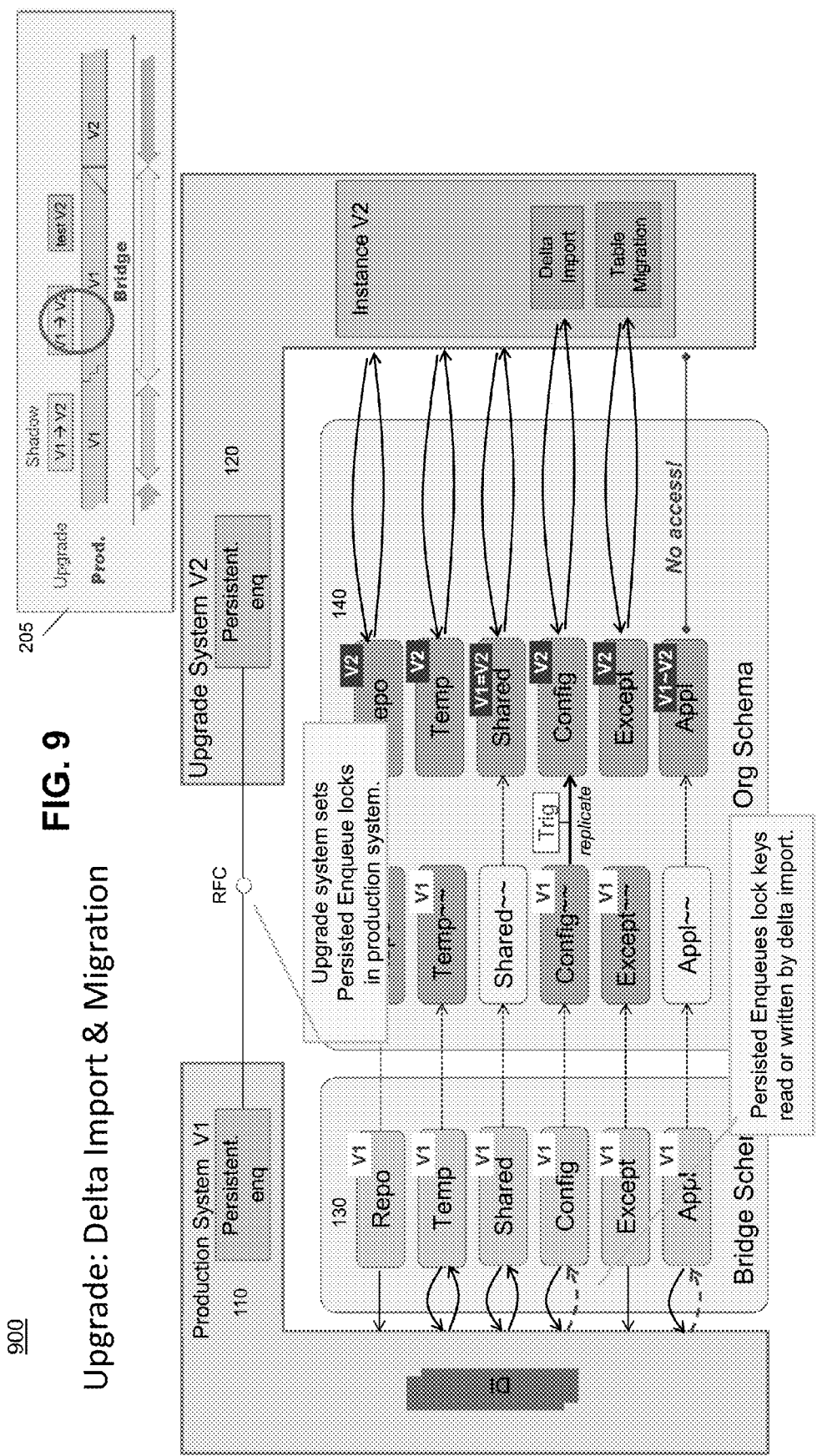

With reference to diagram 900 of FIG. 9, as part of delta import and table migration, the content brought by the upgrade is deployed to the config tables. The import of content can also be done by programs running in the application server. The tools create persistent enqueue locks in the production system for changed keys, where the production shall not change content any more. For other changes, where production and upgrade change the same keys, the changes are not replicated, the upgrade wins.

Figure 10:
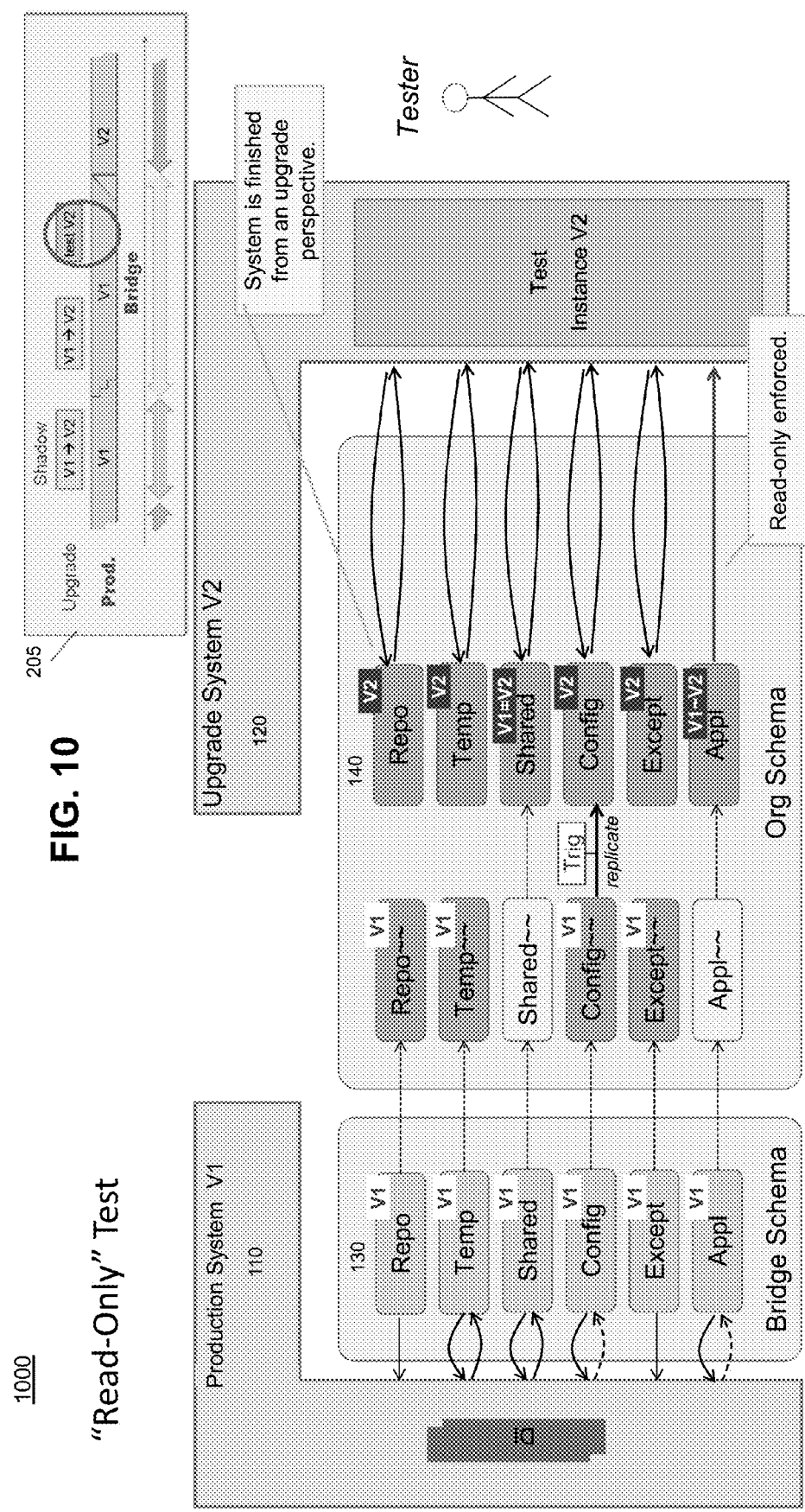

With reference to diagram 1000 of FIG. 10, for read-only tests, the application tables are equipped with freeze triggers. These triggers ensure, no content changes can be done by the database user of the original schema 140. The user of the bridge schema 130 can still change content. In addition, the dialog instances of the upgrade are started and opened for test users. Further, users can read all data, they can write data of category "Repo", "Config", "Share", "Temp" and "Exception". Application data cannot be changed.

Figure 11:
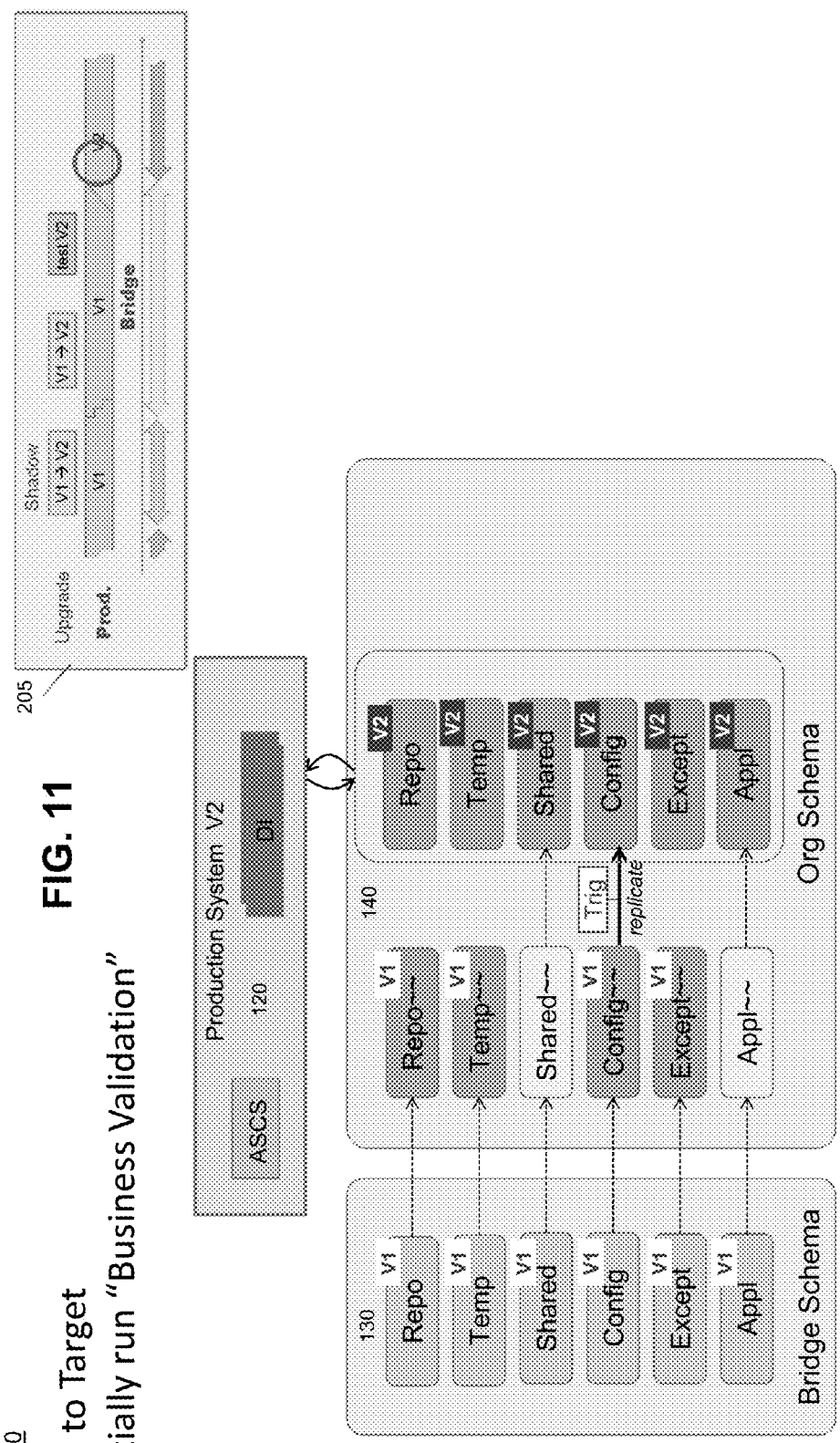

With reference to diagram 1100 of FIG. 11, users of the production system 120 (running V2) can be switched from bridge schema 130 to the original schema 140. Batches are phased out, users are logged off, and queues are run until they become empty.

Figure 12:
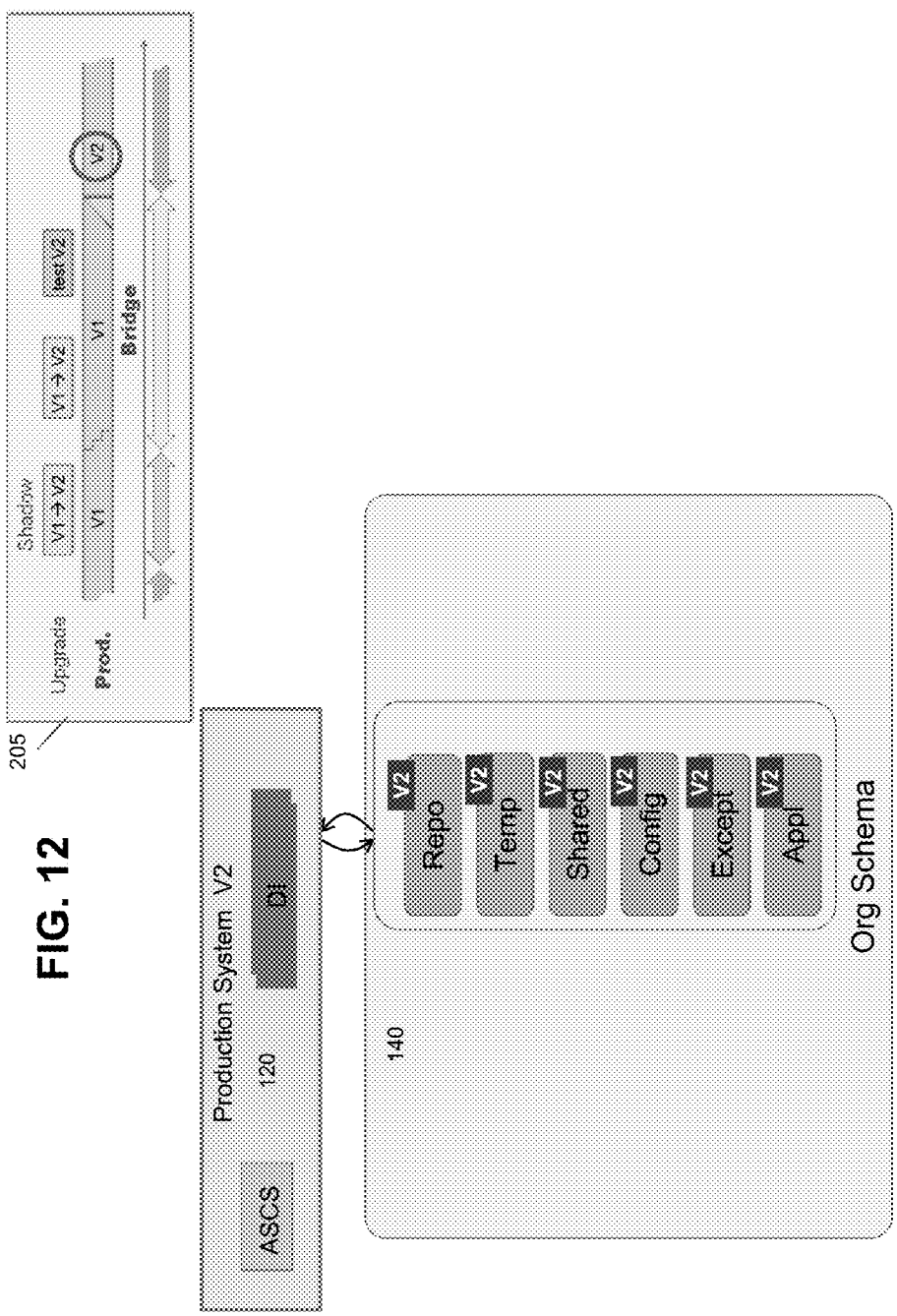

With reference to diagram 1200 of FIG. 12, the target system (production system 120) is next opened for all users. In addition, upgrade artifacts can be cleaned up.

The current subject matter uses database functions which are referred to herein as select triggers. Select triggers can be executed upon a select on the table for which the function is defined (i.e., the select triggers can be associated with specific tables, etc.). The database can pass the keys read in a table (either a shared table or a cloned table) to the function. The function can then execute an operation knowing the selected keys to issue a write lock either on the same table for the passed keys or on the respective clone table.

The locks can be realized for example using database functions referred to as freeze triggers which can return an error in case an update is executed for a key range which shall be locked. The freeze trigger can read the locked ranges from a lock table. This lock table can be updated by the select trigger.

A select operation shall not issue a database commit. If the select trigger writes to the lock table, a sub-transaction can be used. The sub transaction can be opened for an update and only the sub-transaction is committed. The sub-transaction does not commit the outer transaction which issued the read statement. In case the outer transaction is rolled back, the sub-transaction is rolled back as well. In some variations, complete rows are locked as opposed to individual fields in the production/cloned table.

As noted above, the select trigger can be defined for a particular table. The select trigger can be called for every read access from the table by the upgrade procedure and the selected keys and key ranges can be passed to the selected trigger.

The trigger can then store the where clause in a configuration table of the freeze trigger.

Below are examples:

select * from TABLE where key="1".

The "1" is written to the lock table.

select * from TABLE where key like "%5".

The pattern "%5" is then read and the read keys are written to the lock table LOCK_TABLE for the freeze trigger. Assume there had been keys "15" and "25", the entries in the configuration table would be "15" and "25".

Select * from TABLE where key in (select key from TABLE_2 where <where clause>)

The result set of the "(select key from TABLE_2 where <where clause>)" can be stored. The result set is this way "fix". Storing the select clause might get a different result set if the freeze trigger executes it at a later point in time.

The TABLE_2 is also triggered and the read keys from TABLE_2 by the <where clause> are stored in the respective configuration table LOCK_TABLE_2 of the freeze trigger for the TABLE_2.

Figure 13:
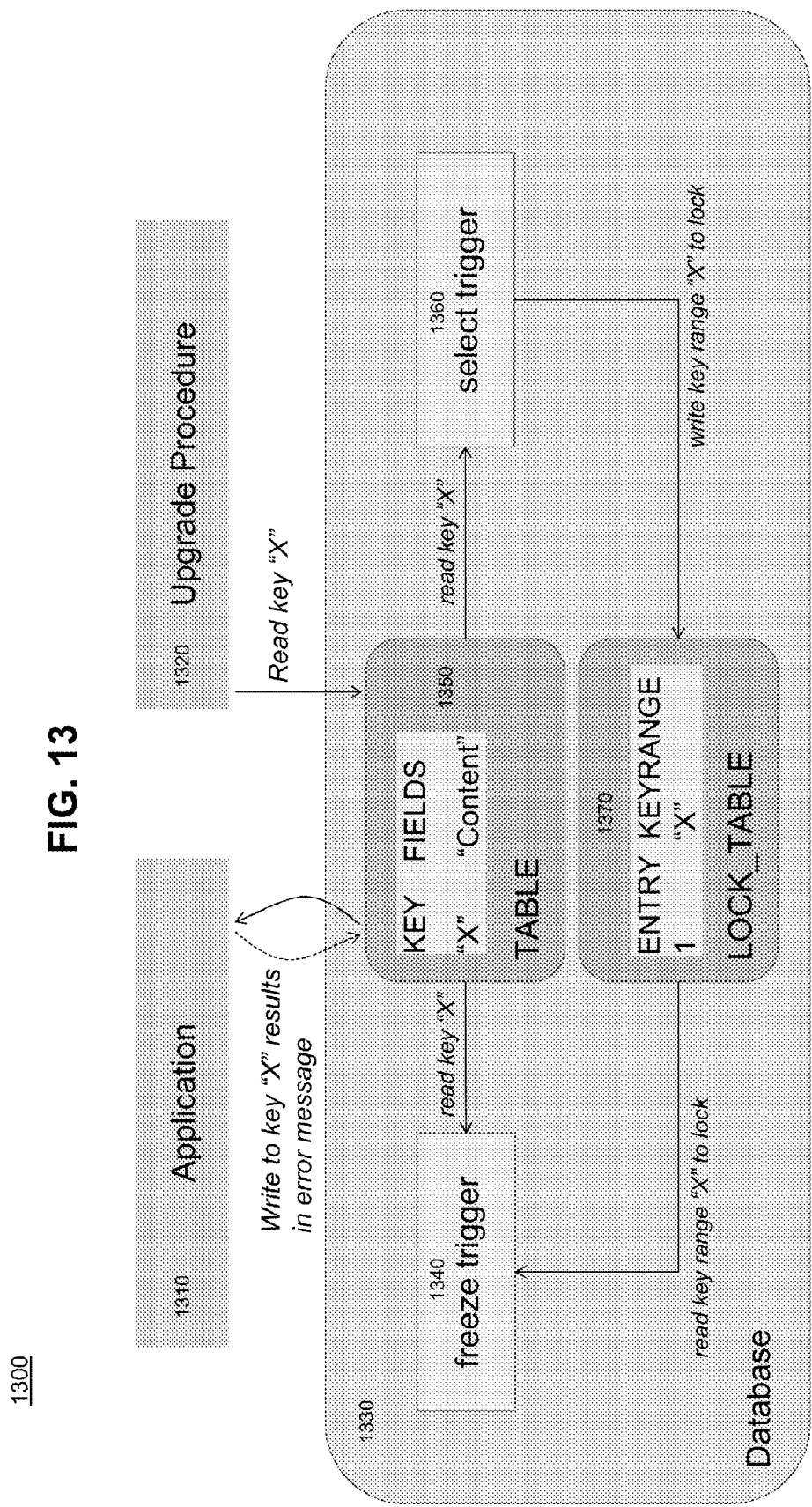
FIG. 13 is a diagram illustrating use of a lock table on a shared production table.

With reference to diagram 1300 of FIG. 13, an application 1310 (which can form part of a source system) and an upgrade procedure 1320 both can periodically access a database 1330. The upgrade procedure 1320 can first access a shared table 1350 to read key "X". A select trigger 1360 associated with the shared table 1350 can then cause the read of key "X" (or in cases of ranges of keys, the range) to be entered into a lock table 1370 as being locked. Subsequently, the application 1310 can initiate a write operation in shared table 1350. In response to the write to key "X" operation, a freeze trigger 1350 associated with the shared table 1350 can access the lock table 1370 to determine whether or not the key "X" is locked. As the upgrade procedure 1320 previously read key "X" from shared table 1350, the select trigger 1360 caused an entry in the lock table 1370 to indicate that the read key "X" is locked, and as a result, the freeze trigger 1340, after accessing the lock table 1370, can determine that the key "X" should be locked in the shared table 1350. As a result, the freeze trigger 1340 can cause the database 1330 to respond to the write to key operation by the application 1310 with an error message (which prevents the write operation from occurring).

Figure 14:
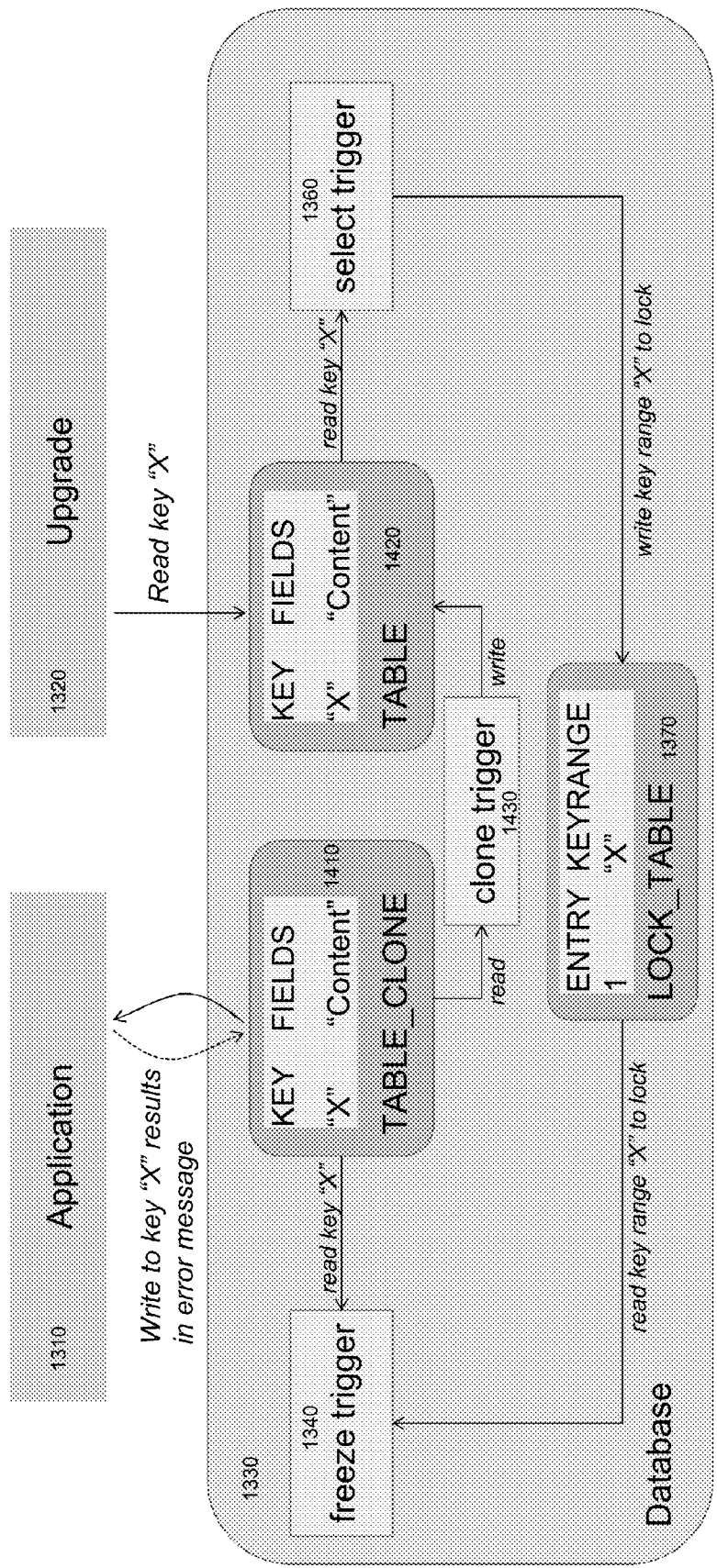
FIG. 14 is a diagram illustrating use of a lock table in connection with a production table and a corresponding cloned table.

Diagram 1400 of FIG. 14 shows a variation in which there is no shared table (as in shared table 1350 of FIG. 13) but rather, a clone table 1410 which is a clone of table 1430. Such cloning can be accomplished via cloning trigger 1420 that causes changes in the table 1430 to be automatically implemented in the clone table 1410. With this arrangement, a read of key "X" in table 1430 by the upgrade procedure 1320, can cause the select trigger 1360 to add an entry for key "X" in the lock table 1370 (which indicates that such entry is locked or otherwise not accessible). If the application 1310 later attempts to write to key "X" in the clone table 1410 which can cause the freeze trigger 1340 to access the lock table 1370 to determine whether or not there is a lock entry corresponding to key "X". As there is such an entry, the freeze trigger 1340 can then cause the database 1310 to respond to the application 1310 with an error message (which indicates that such key "X" is locked).

As another example, a persistent database lock against an upgrade procedure can be implemented by a select trigger as follows. A lock table can be provided which can store a table name and a key to lock: LOCK_TABLE. An update trigger can be created for each table (on trigger for "insert, update and delete" or one trigger for each of these operations, depending on the database). This update trigger can read the lock table LOCK_TABLE. If the table to be updated is found and the key patterns match or overlap, the trigger can return an error message. The change in the corresponding table is prevented. The error message can take a variety of forms including, for example, "upgrade running, functionality is currently not available"—which can be conveyed to an end user. The locking as provided in the lock table can be released upon the switch from the source system to the target system (i.e., the upgrade is completed).

In some cases, there can be application server side buffering (a cache is used in the application server to serve read requests from the cache rather than reading the entry every time from the database. The entry is only read once, then cached and there is a synchronization mechanism to refresh the cache, when the entry is changed on the database). A read attempt performed by the upgrade can be answered by such an application server side buffer. This read attempt would thus not be detected by the select trigger. Such an arrangement can be managed by flushing all buffers at the beginning of the upgrade actions. Therefore, the new version application server can be started fresh for the upgrade. Thus, all keys are read at least once from the database even if cached later in the application server.

The internal table buffers in the application server can, in some variations, do pre-fetching and read keys which the running upgrade code (or application code) do not request. In this case, the select trigger and the freeze trigger can lock larger ranges than the upgrade procedure requires. Therefore, pre-fetching can, in some cases, be disabled for affected tables in the application server performing the upgrade to minimize the impact of the upgrade to production.

For test scenarios, the select trigger can avoid a block of the write attempt; however all information can be stored to later compute access violations. A block of the write operation can abort the action in production and only the first block can be found in a process. In tests, collisions are important to know. The goal is to extend the application and upgrade packages to operate on disjoint set of data. To achieve this, the full set of collisions needs to be known.

The select trigger can write, which table and table keys (and key patterns) had been read. The update trigger on the production tables can store write access by the production. An analysis report can read both data sets and compare the keys and report key collisions.

Moreover, a select trigger can also be used in other scenarios. For example, select triggers can be used to record read access by users or to do an access counting.

Figure 15:
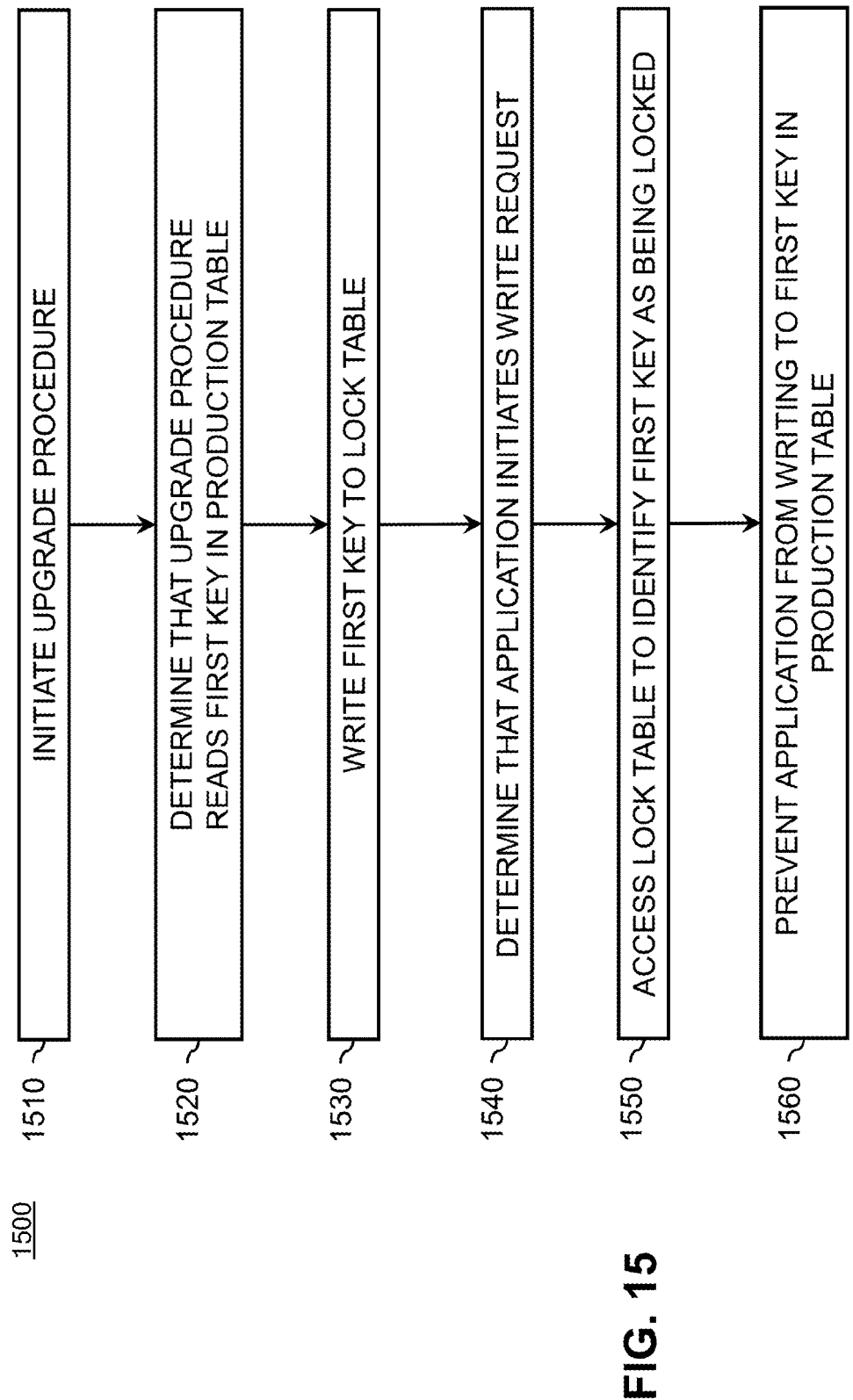
FIG. 15 is a first process flow diagram illustrating management of write accesses during an upgrade procedure.

FIG. 15 is a process flow diagram 1500 in which, at 1510, an upgrade procedure is initiated that updates a source system to a target system. The upgrade procedure prepares software for the target system in parallel to operation of an application on the source system. Later, at 1520, a select trigger determines that the upgrade procedure reads a first key in a production table being used both by the upgrade procedure and the application. Next, at 1530, the select trigger writes the first key into a lock table. Afterwards, at 1540, the freeze trigger determines that the application initiated a write request for the first key in the production table. The freeze trigger then, at 1550, accesses the lock table to identify the first key as being locked. Thereafter, at 1560, the application is prevented from writing to the first key in the production table based on the identification in the lock table.

Figure 16:
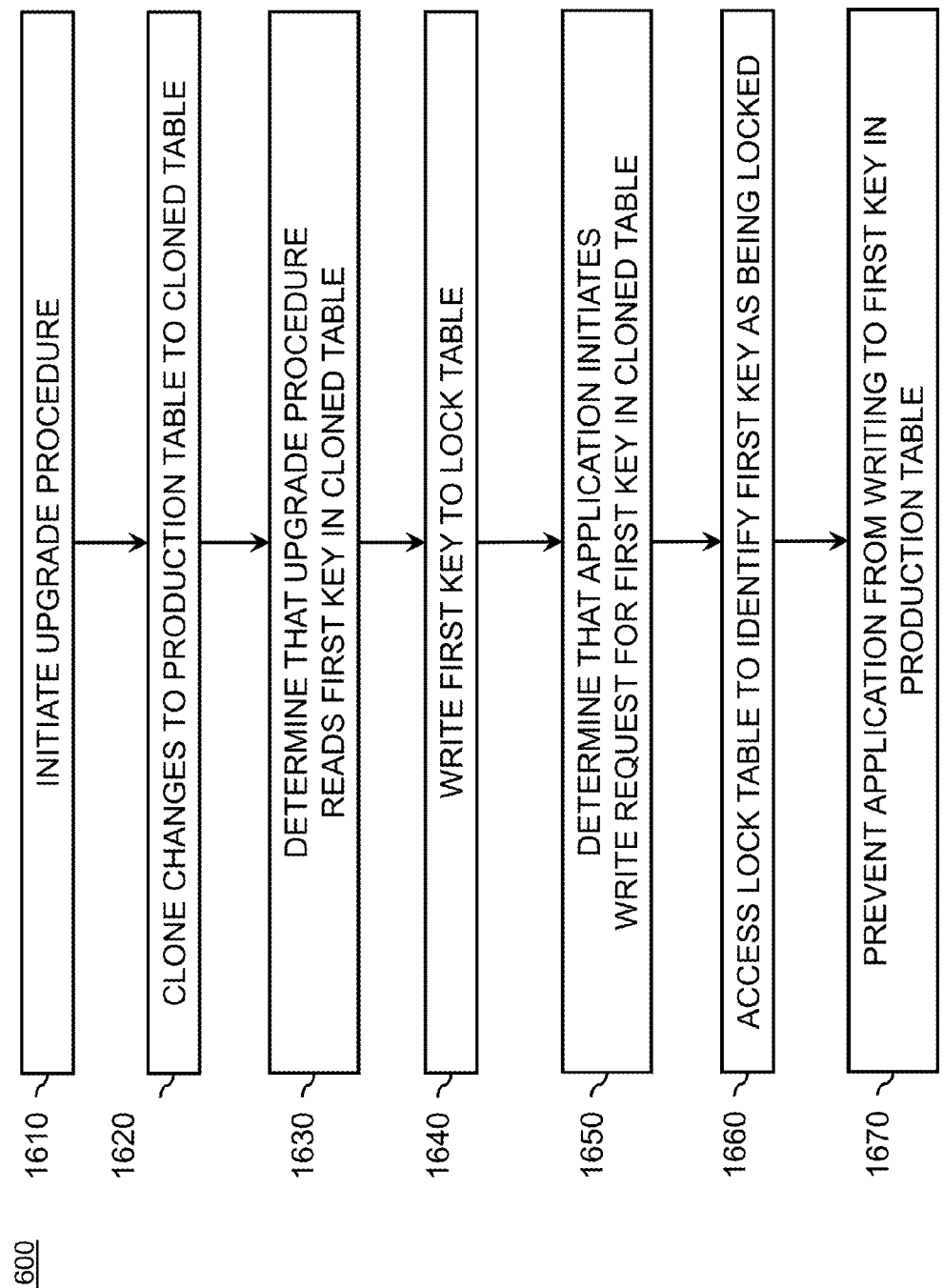
FIG. 16 is a second process flow diagram illustrating management of write accesses during an upgrade procedure.

FIG. 16 is a process flow diagram 1600 in which, at 1610, an upgrade procedure is initiated that updates a source system to a target system. The upgrade procedure prepares software for the target system in parallel to operation of an application on the source system. In addition, at 1620, a clone trigger clones changes to a production table used by the application to a table being used by the upgrade procedure. It is determined, at 1630 and by a select trigger, that the upgrade procedure read a first key in the production table. The select trigger then, at 1640, writes the first key into a lock table. Subsequently, at 1650, it is determined, by a freeze trigger, that the application initiated a write request for the first key in the cloned table. The freeze trigger then, at 1660, accesses the lock table to identify the first key as being locked. Thereafter, the application, at 1670, is prevented from writing to the first key based on the identification in the lock table.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    initiating an upgrade procedure that updates a source system to a target system, the upgrade procedure preparing software for the target system in parallel to operation of an application on the source system;
    determining, by a select trigger, that the upgrade procedure reads a first key in a production table being used both by the upgrade procedure and the application, wherein the first key comprises a range of keys in the production table;
    writing, by the select trigger, the first key into a lock table, wherein the application is able to write to the first key in the production table after switching from the source system to the target system;
    determining, by a freeze trigger after the first key is written into a lock table, that the application initiated a write request for the first key in the production table;
    accessing, by the freeze trigger, the lock table to identify the first key as being locked; and
    preventing the application from writing to the first key in the production table based on the identification in the lock table.

2. The method of claim 1, wherein the upgrade procedure comprises selectively (i) renaming source tables of the source system, (ii) cloning the renamed source tables for the target system, (iii) equipping the cloned tables with database triggers to transfer data to target tables used by the source system according to a source database schema, (iv) generating the target tables comprising updated software content for later use by the target system while the source tables are used via a bridge database schema, and (v) sharing tables between the source database schema accessed via the bridge database schema and the target system.

3. The method of claim 2, wherein the upgrade procedure is a zero downtime maintenance upgrade procedure.

4. The method of claim 1 further comprising clearing entries in the lock table upon switching from the source system to the target system.

5. The method of claim 1, wherein the source system comprises memory and at least one data processor and the target system comprises memory and at least one data processor.

6. The method of claim 1, wherein at least one of the: initiating, determining, writing, determining, accessing, or preventing are implemented by at least one data processor forming part of at least one computing device.

7. A method comprising:
    initiating an upgrade procedure that updates a source system to a target system, the upgrade procedure preparing software for the target system in parallel to operation of an application on the source system;
    cloning, by a clone trigger, changes to a production table used by the application to a table being used by the upgrade procedure;
    determining, by a select trigger, that the upgrade procedure read a first key in the production table, wherein the first key comprises a range of keys in the production table;
    writing, by the select trigger, the first key into a lock table, wherein the application is able to write to the first key in the production table after switching from the source system to the target system;
    determining, by a freeze trigger after the first key is written into a lock table, that the application initiated a write request for the first key in the production table;
    accessing, by the freeze trigger, the lock table to identify the first key as being locked; and
    preventing the application from writing to the first key based on the identification in the lock table.

8. The method of claim 7, wherein the upgrade procedure comprises selectively (i) renaming source tables of the source system, (ii) cloning the renamed source tables for the target system, (iii) equipping the cloned tables with database triggers to transfer data to target tables used by the source system according to a source database schema, (iv) generating the target tables comprising updated software content for later use by the target system while the source tables are used via a bridge database schema, and (v) sharing tables between the source database schema accessed via the bridge database schema and the target system.

9. The method of claim 8, wherein the upgrade procedure is a zero downtime maintenance upgrade procedure.

10. The method of claim 7, wherein the source system comprises memory and at least one data processor and the target system comprises memory and at least one data processor.

11. The method of claim 7, wherein at least one of the: initiating, cloning, determining, writing, determining, accessing, or preventing are implemented by at least one data processor forming part of at least one computing device.

12. A system comprising:
    a source system comprising at least one data processor and memory storing instructions for execution by the corresponding at least one data processor; and
    a target system comprising at least one data processor and memory storing instructions for execution by the corresponding at least one data processor;
    wherein:
        an upgrade procedure is initiated that updates the source system to the target system, the upgrade procedure prepares software for the target system in parallel to operation of an application on the source system;
        a select trigger determines that the upgrade procedure reads a first key in a production table being used both by the upgrade procedure and the application, wherein the first key comprises a range of keys in the production table;
        the select trigger writes the first key into a lock table, wherein the application is able to write to the first key in the production table after switching from the source system to the target system;
        a freeze trigger determines, after the first key is written into a lock table, that the application initiated a write request for the first key in the production table;
        the freeze trigger accesses the lock table to identify the first key as being locked; and
        the application is prevented from writing to the first key in the production table based on the identification in the lock table.

13. The system of claim 12, wherein the upgrade procedure comprises selectively (i) renaming source tables of the source system, (ii) cloning the renamed source tables for the target system, (iii) equipping the cloned tables with database triggers to transfer data to target tables used by the source system according to a source database schema, (iv) generating the target tables comprising updated software content for later use by the target system while the source tables are used via a bridge database schema, and (v) sharing tables between the source database schema accessed via the bridge database schema and the target system.

14. The system of claim 13, wherein the upgrade procedure is a zero downtime maintenance upgrade procedure.

* * * * *